(12) United States Patent
Kailey et al.

(10) Patent No.: US 12,045,521 B1
(45) Date of Patent: Jul. 23, 2024

(54) HALFTONE MODIFICATION MECHANISM

(71) Applicants: Walter F. Kailey, Boulder, CO (US); Mikel Stanich, Boulder, CO (US)

(72) Inventors: Walter F. Kailey, Boulder, CO (US); Mikel Stanich, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/171,873

(22) Filed: Feb. 21, 2023

(51) Int. Cl.
G06K 15/02 (2006.01)
B41J 2/21 (2006.01)
G06F 3/12 (2006.01)

(52) U.S. Cl.
CPC ............ *G06F 3/1208* (2013.01); *G06F 3/122* (2013.01); *G06F 3/1256* (2013.01); *G06F 3/1282* (2013.01)

(58) Field of Classification Search
None
See application file for complete search history.

(56) References Cited

U.S. PATENT DOCUMENTS

| | | | |
|---|---|---|---|
| 5,659,342 A | 8/1997 | Lund et al. | |
| 7,431,420 B2 | 10/2008 | Inoue | |
| 7,588,313 B2 | 9/2009 | Kawaguchi et al. | |
| 8,272,705 B2 | 9/2012 | Itogawa | |
| 8,277,020 B2 | 10/2012 | Miyamoto et al. | |
| 8,287,066 B2 | 10/2012 | Jackson | |
| 8,511,773 B2 | 8/2013 | Itogawa | |
| 8,662,612 B2 | 3/2014 | Sasaki | |
| 8,705,111 B2 | 4/2014 | Masuda et al. | |
| 8,905,517 B2 | 12/2014 | Chand et al. | |
| 8,991,962 B2 | 3/2015 | Gerrits | |
| 8,998,378 B2 | 4/2015 | De Smet et al. | |
| 9,044,950 B2 | 6/2015 | Sato et al. | |
| 9,061,518 B2 | 6/2015 | Chandu et al. | |
| 9,216,572 B2 | 12/2015 | Sudo et al. | |
| 9,302,483 B2 | 4/2016 | Mizutani | |

(Continued)

FOREIGN PATENT DOCUMENTS

| | | | |
|---|---|---|---|
| JP | 2011063024 A | 3/2011 | |
| JP | 4844662 | 12/2011 | |

(Continued)

OTHER PUBLICATIONS

Sreenath Rao Vantaram, Kartheek Chandu, Mikel Stanich, Larry Ernst, "An uniformity algorithm for high-speed fixed-array printers," Proc. SPIE 9024, Image Processing: Machine Vision Applications VII, 90240W (Mar. 7, 2014); https://doi.org/10.1117/12.2036611.

*Primary Examiner* — Andrew H Lam
(74) *Attorney, Agent, or Firm* — Jaffery Watson Mendonsa & Hamilton LLP

(57) ABSTRACT

A printing system is disclosed. The printing system includes at least one physical memory device to store halftone modification logic and one or more processors coupled with at least one physical memory device to execute the halftone modification logic to receive a first halftone design comprising a first threshold array associated with a plurality of pel forming elements, receive a flush pattern comprising a flushing array defining a plurality of flush drop locations associated with the plurality of pel forming elements and generate a second halftone design based on the first threshold array and the flush pattern, wherein the second halftone design defines the plurality of flush drop locations.

20 Claims, 10 Drawing Sheets

(56) References Cited

U.S. PATENT DOCUMENTS

| | | | |
|---|---|---|---|
| 9,352,570 B2 | 5/2016 | Yamazaki et al. | |
| 9,463,638 B1 | 10/2016 | Kroon | |
| 9,542,130 B2 | 1/2017 | Subbaian | |
| 9,573,382 B1 | 2/2017 | Metcalfe | |
| 9,757,941 B2 | 9/2017 | Verdugo et al. | |
| 9,809,036 B2 | 11/2017 | Chandu et al. | |
| 9,889,668 B2 | 2/2018 | Kifuku | |
| 9,895,893 B2 | 2/2018 | Yamazaki et al. | |
| 9,931,849 B2 | 4/2018 | Katoh et al. | |
| 9,975,348 B2 | 5/2018 | Chandu et al. | |
| 9,987,847 B2 | 6/2018 | Takahashi | |
| 10,011,109 B2 | 7/2018 | Ikeda | |
| 10,046,558 B1 | 8/2018 | Darling | |
| 10,112,398 B2 | 10/2018 | Iida et al. | |
| 10,252,532 B2 | 4/2019 | Mitsuo et al. | |
| 10,261,735 B2 | 4/2019 | Sakurai et al. | |
| 10,442,211 B2 | 10/2019 | Stanich et al. | |
| 10,654,274 B2 | 5/2020 | Murayama et al. | |
| 10,654,276 B2 | 5/2020 | Enjo et al. | |
| 10,682,857 B2 | 6/2020 | Ferreri et al. | |
| 10,723,133 B2 | 7/2020 | Ferreri et al. | |
| 10,757,270 B2 | 8/2020 | Stanich et al. | |
| 10,850,501 B2 | 12/2020 | Hatanaka et al. | |
| 10,899,131 B2 | 1/2021 | Asai | |
| 10,926,542 B2 | 2/2021 | Ferreri et al. | |
| 11,072,178 B1 * | 7/2021 | Kailey | B41J 2/16526 |
| 11,077,674 B2 | 8/2021 | Stanich et al. | |
| 11,182,113 B2 | 11/2021 | Stanich et al. | |
| 11,184,504 B2 | 11/2021 | Stanich et al. | |
| 11,216,710 B1 | 1/2022 | Stanich et al. | |
| 11,283,936 B1 * | 3/2022 | Stanich | B41J 2/17566 |
| 11,305,550 B2 | 4/2022 | Stanich et al. | |
| 11,396,182 B2 | 7/2022 | Kamon | |
| 11,443,152 B1 * | 9/2022 | Stanich | H04N 1/6041 |
| 11,477,343 B2 | 10/2022 | Stanich et al. | |
| 11,531,854 B2 | 12/2022 | Otani et al. | |
| 11,539,857 B2 | 12/2022 | Kailey et al. | |
| 11,577,514 B2 | 2/2023 | Kotsuji et al. | |
| 11,579,827 B1 | 2/2023 | Young et al. | |
| 11,602,930 B2 | 3/2023 | Yamashita | |
| 11,637,946 B2 | 4/2023 | Stanich et al. | |
| 2013/0176578 A1 * | 7/2013 | Chandu | H04N 1/4051 358/1.9 |
| 2022/0024200 A1 | 1/2022 | Alonso et al. | |
| 2022/0024202 A1 | 1/2022 | Verdugo et al. | |
| 2022/0055372 A1 | 2/2022 | Yamanaka | |
| 2022/0088922 A1 | 3/2022 | Verdugo et al. | |
| 2022/0184969 A1 | 6/2022 | Stanich et al. | |
| 2022/0234358 A1 | 7/2022 | Steurrys et al. | |
| 2022/0286578 A1 | 9/2022 | Stanich et al. | |
| 2023/0021220 A1 | 1/2023 | Watanabe | |

FOREIGN PATENT DOCUMENTS

| | | |
|---|---|---|
| JP | 2014184597 A | 10/2014 |
| JP | 5845749 | 1/2016 |
| JP | 5899222 | 4/2016 |
| JP | 6018994 | 11/2016 |
| JP | 6032932 | 11/2016 |
| JP | 6051819 | 12/2016 |
| JP | 6056134 | 1/2017 |
| JP | 6119267 | 4/2017 |
| JP | 6197536 | 9/2017 |
| JP | 6237196 | 11/2017 |
| JP | 6237197 | 11/2017 |
| JP | 6256091 | 1/2018 |
| JP | 6273082 | 1/2018 |
| JP | 6309850 | 4/2018 |
| JP | 2018051826 | 4/2018 |
| JP | 6318747 | 5/2018 |
| JP | 6347116 | 6/2018 |
| JP | 6489258 | 3/2019 |
| JP | 6566052 | 8/2019 |
| JP | 6575106 | 9/2019 |
| JP | 6575153 | 9/2019 |
| JP | 6612076 | 11/2019 |
| JP | 6617573 | 12/2019 |
| JP | 6645524 | 2/2020 |
| JP | 6737357 | 8/2020 |
| JP | 6805550 | 12/2020 |
| JP | 6823962 | 2/2021 |
| JP | 6825649 | 2/2021 |
| JP | 2021088183 | 6/2021 |
| JP | 6927344 | 8/2021 |
| JP | 2021146698 | 9/2021 |
| JP | 2021160320 | 10/2021 |
| JP | 2021165012 | 10/2021 |
| JP | 2021172081 | 11/2021 |
| JP | 2021178487 | 11/2021 |
| JP | 2021181167 | 11/2021 |
| JP | 7000719 | 1/2022 |
| JP | 7005448 | 1/2022 |
| JP | 7013159 | 1/2022 |
| JP | 7031274 | 3/2022 |
| JP | 7035460 | 3/2022 |
| JP | 2022034779 | 3/2022 |
| JP | 7094187 | 7/2022 |
| JP | 7111225 | 8/2022 |
| JP | 7136707 | 9/2022 |
| JP | 2022129620 | 9/2022 |
| JP | 2022129724 | 9/2022 |
| JP | 7146413 | 10/2022 |
| JP | 2022148027 | 10/2022 |
| JP | 2022152081 | 10/2022 |
| JP | 7210294 | 1/2023 |
| JP | 2023007061 | 1/2023 |
| JP | 2023013556 | 1/2023 |
| JP | 2023028480 | 3/2023 |
| JP | 2023049442 | 4/2023 |

* cited by examiner mult_array(:,:,1) =

254 230 90  16  2   25  82  222
247 214 132 41  8   58  156 189
99  148 181 140 74  123 173 107
33  66  165 206 239 197 115 49
2   25  82  222 255 230 90  16
8   58  156 189 247 214 132 41
74  123 173 107 99  148 181 140
239 197 115 49  33  66  165 206 mult_array(:,:,2) =

252 228 88  14  1   22  80  219
244 211 129 38  5   55  154 186
96  145 178 137 71  121 170 104
30  63  162 203 236 195 112 47
1   22  80  219 252 228 88  14
5   55  154 186 244 211 129 38
71  121 170 104 96  145 178 137
236 195 112 47  30  63  162 203 mult_array(:,:,3) =

250 225 85  11  0   19  77  217
241 208 126 36  3   52  151 184
93  143 175 134 69  118 167 101
27  60  159 200 233 192 110 44
0   19  77  217 250 225 85  11
3   52  151 184 241 208 126 36
69  118 167 101 93  143 175 134
233 192 110 44  27  60  159 200

Flushing pattern

```
0 0 0 1 0 0 0 0
0 0 0 0 0 0 0 0
0 0 0 0 0 0 0 0
0 0 0 0 0 0 0 1
0 1 0 0 0 0 0 0
0 0 0 0 0 0 0 0
0 0 0 0 0 0 0 0
0 0 0 1 0 0 0 0
```

301 mult_array(:,:,3) =

| 250 | 225 | 85 | 11 | 0 | 19 | 77 | 217 |
| 241 | 208 | 126 | 36 | 3 | 52 | 151 | 184 |
| 93 | 143 | 175 | 134 | 69 | 118 | 167 | 101 |
| 27 | 60 | 159 | 200 | 233 | 192 | 110 | 44 |
| 0 | 19 | 77 | 217 | 250 | 225 | 85 | 11 |
| 3 | 52 | 151 | 184 | 241 | 208 | 126 | 36 |
| 69 | 118 | 167 | 101 | 93 | 143 | 175 | 134 |
| 233 | 192 | 110 | 44 | 27 | 60 | 159 | 200 |

302

Modified mult_array(:,:,3)

| 250 | 225 | 85 | -1 | 0 | 19 | 77 | 217 |
| 241 | 208 | 126 | 36 | 3 | 52 | 151 | 184 |
| 93 | 143 | 175 | 134 | 69 | 118 | 167 | 101 |
| 27 | 60 | 159 | 200 | 233 | 192 | 110 | -1 |
| 0 | -1 | 77 | 217 | 250 | 225 | 85 | 11 |
| 3 | 52 | 151 | 184 | 241 | 208 | 126 | 36 |
| 69 | 118 | 167 | 101 | 93 | 143 | 175 | 134 |
| 233 | 192 | 110 | -1 | 27 | 60 | 159 | 200 |

HALFTONE MODIFICATION MECHANISM

FIELD OF THE INVENTION

The invention relates to the field of image reproduction, and in particular, to flushing printheads.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead includes many nozzles (e.g., inkjet nozzles) for the ejection of ink or any colorant suitable for printing on a medium.

To ensure that ink does not dry in the nozzle (which can clog the nozzle and decrease print quality), flush marks (or flushing patterns) may be periodically printed by the nozzles, which are printed onto non-used portions of the web. Alternatively, nozzle flushing may be dispersed within portions of the web marked with print data. However, printers currently require a separate pass to merge flushing patterns with the image data from the print job in inkjet printing. Implementing flushing patterns as a separate pass requires additional hardware and/or software. Additionally, separate logic is required to ensure that larger drops in print job data are not overwritten/replaced with the small flushing drops since flushing drops are typically implemented using small size drops to minimize the visibility of the flushing drops.

Accordingly, a mechanism to more efficiently perform nozzle flushing is desired.

SUMMARY

In one embodiment, a printing system is disclosed. The printing system includes at least one physical memory device to store halftone modification logic and one or more processors coupled with at least one physical memory device to execute the halftone modification logic to store halftone modification logic and one or more processors coupled with at least one physical memory device to execute the halftone modification logic to receive a first halftone design comprising a first threshold array associated with a plurality of pel forming elements, receive a flush pattern comprising a flushing array defining a plurality of flush drop locations associated with the plurality of pel forming elements and generate a second halftone design based on the first threshold array and the flush pattern, wherein the second halftone design defines the plurality of flush drop locations.

BRIEF DESCRIPTION OF THE DRAWINGS

A better understanding of the present invention can be obtained from the following detailed description in conjunction with the following drawings, in which:

FIG. 3B one embodiment of a modification based on thresholds in FIG. 3A;

DETAILED DESCRIPTION

A mechanism to modify halftones to implement flushing patterns is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
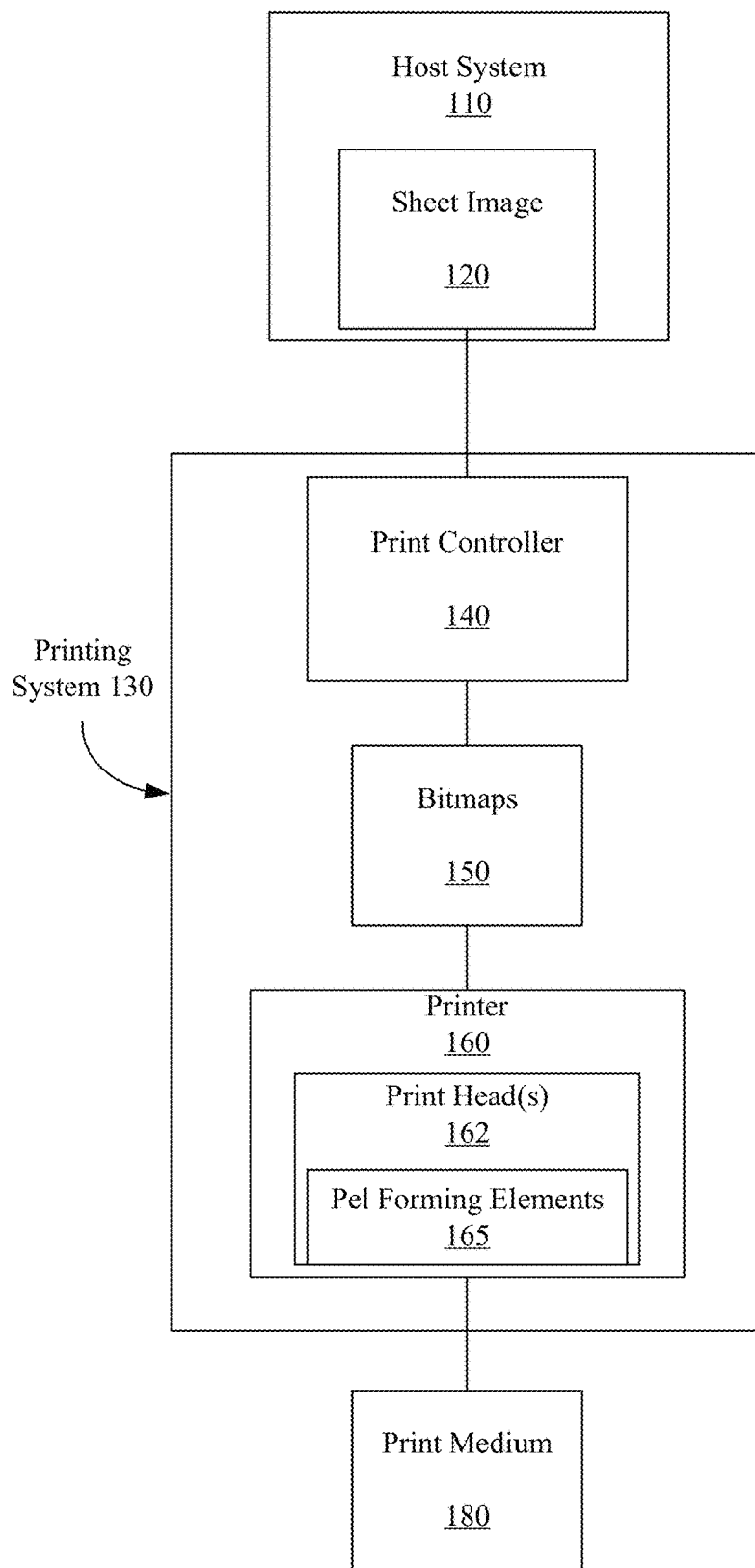
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle. The pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. Further, the pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head 162) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 includes the instructions (e.g., instructed ink drop size and/or instructed pel forming element location) for the one or more printheads 162 and pel forming elements 165. Bitmap 150 may be a halftoned bitmap (e.g., a compensated halftone bit map generated from compensated halftones, or uncompensated halftone bit map generated from uncompensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
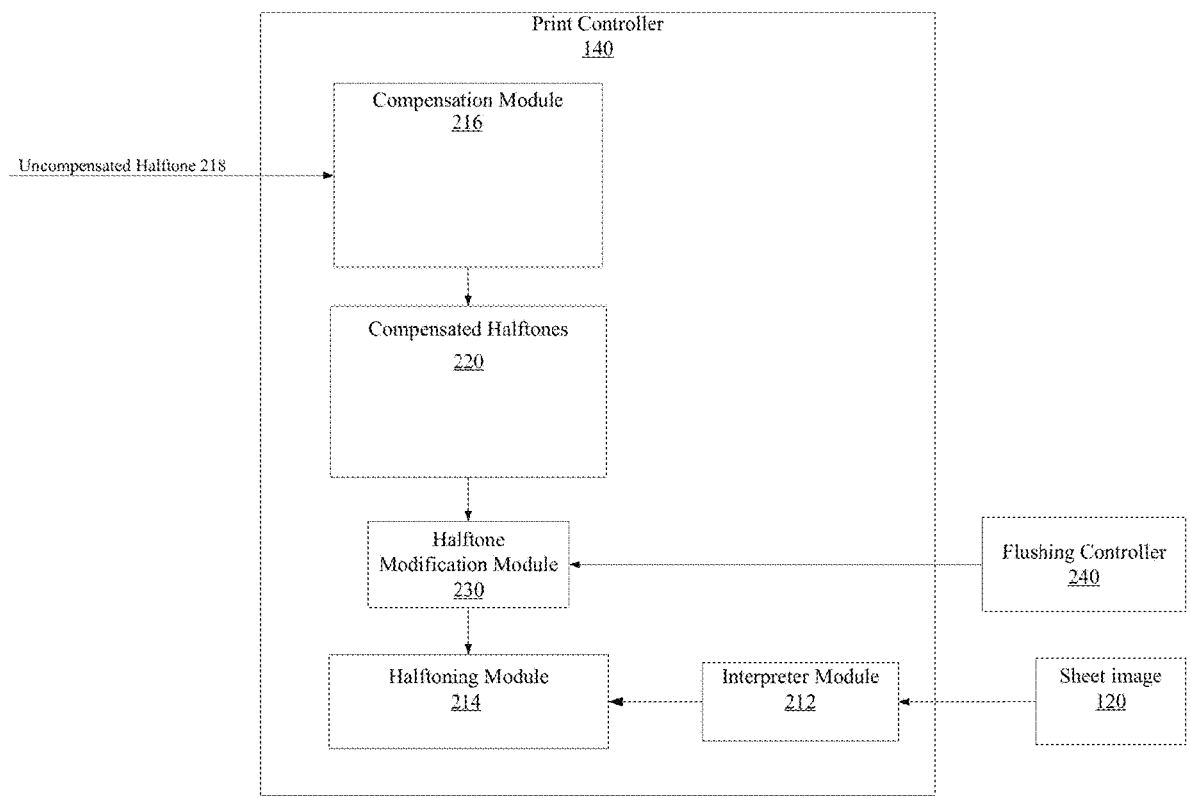
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a compensation module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheet-side images such as sheet image 120) of a print job into sheetside bitmaps. The sheetside bitmaps generated by the interpreter module 212 are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, print controller 140 may implement transfer functions applied directly to image data as a part of the image processing prior to printing. In that case, the contone image data (CTI) is transformed (e.g., compensated) by the transfer functions prior to halftoning.

Halftoning module 214 is operable to represent the sheet-side bitmaps as halftone patterns of ink. For example, halftoning module 214 may convert the pels (also known as pixels) values to halftone bitmaps that are used create halftone patterns of CMYK ink for application to the paper by applying the halftone design to the images of a print job. A halftone design may comprise a pre-defined mapping of input pel gray levels to output drop sizes based on pel location. Halftone designs may be implemented using threshold arrays that comprise a set of thresholds which define the output levels (e.g., drop sizes) for a collection of pels corresponding to the input pel gray levels (e.g., digital counts). The set of thresholds for a halftone is defined to be a threshold array (TA). A print system having multiple colors includes halftone designs for each color plane.

In one embodiment, the halftone design may include a finite set of transition thresholds between a finite collection of successively larger instructed drop sizes, beginning with a zero ink drop size (e.g., no ink ejected) and ending with a maximum ink drop size (e.g., none, small, medium and or large drop sizes). The halftone design may be implemented as threshold arrays (e.g., halftone threshold arrays) such as single bit threshold arrays or multibit threshold arrays). In another embodiment, the halftone design may include a three-dimensional look-up table with all included gray level values.

In a further embodiment, halftoning module 214 performs the multi-bit halftoning using the halftone design comprising a set of threshold values for each pel in the sheetside bitmap, where there is one threshold for each instructed non-zero ink drop size (e.g., small, medium and large drop sizes). The pel is halftoned with the drop size corresponding to threshold values for that pel. The set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone pel values in the sheetside bitmap.

This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level (e.g., the contone value) for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

For multi-bit halftones, the MTA is a three-dimensional array including one two-dimensional array for each drop size transition. FIG. 3 illustrates one embodiment of such MTA's. In one embodiment, the maximum value of an MTA is 254, while a minimum value is 0. MTA includes a set of two-dimensional arrays of thresholds for transition between drop sizes: plane one provides the threshold for the Large output level, while plane 2 and plane 3 provide thresholds for the Medium and Small output levels respectively for a system having three drop sizes not including zero drop size (none or off). In other embodiments, different one-to-one relationship may be used since the correspondence between plane numbers and drop sizes is arbitrary.

To use these threshold arrays for halftoning, in the case where the threshold arrays are smaller than the sheetside map, each multibit threshold array is tiled across contone image data provided by the sheetside bitmap, which provides a set of threshold values for each pel in the sheetside bitmap. The contone image data (e.g., gray level data) is logically compared to the threshold array data on a pel basis. In the case of Large drops, they are produced by the halftoning when the image contone data is greater than the respective large threshold values in plane 1 (as used in the following examples). The logical comparison used to produce a Large drop size is a matter of design choice and may alternately include determining if the contone image data value is greater-than-or-equal to the respective threshold array value in plane 1.

Medium drops are produced when the image data is greater than the medium drop plane 2 thresholds and also the image data is less than or equal to the large drop thresholds in plane 1 (in agreement with the example comparison logic used above). Using the alternate logical equations Medium drops are produced when the image data is greater than or equal to the medium drop plane 2 thresholds and also the image data is less than the large drop thresholds in plane 1 (in agreement with the example comparison logic used above). Small drops are produced when the image data is greater than the small drop thresholds in plane 3 and also the image data is less than or equal to the medium drop thresholds in plane 2. Using the alternate logical equations Small drops are produced when the image data is greater than or equal to the small drop plane 3 thresholds and also the image data is less than the medium drop thresholds in plane 2.

Finally, the off/none drop size occurs for cases when the contone values are less than or equal (in agreement with the example comparison logic used above) to the small drop thresholds in plane 3. Using the alternate logical equations the off/none drops are produced when the image data is less than the small drop thresholds in plane 3.

In this embodiment of a two-bit multibit printing system, this set of four logical equations, used with thresholds from each plane of the multibit threshold array permit each printing drop size to be defined, based on the contone values.

In other embodiments, the number of planes of threshold data may be extended to handle any number of drop sizes. The data from these two-dimensional arrays may be segmented into separate memory regions and stored in any convenient order. For example, the thresholds for each drop size transition may be stored contiguously in memory, and it is often advantageous to do so.

Compensation module 216 performs a compensation (e.g., a uniformity compensation) process on an un-compensated halftone 218, or previously generated uniformity compensated halftone, received at print controller 140 to generate one or more compensated halftones 220. Compensated halftones 220 are then received at halftoning module 214 along with the sheetside bitmap. In one embodiment, an un-compensated halftone 218 represents a reference halftone design that is modified to create the compensated halftones.

According to one embodiment, print controller 140 also includes a halftone modification module 230 implemented to modify compensated halftones 220 to generate flushing threshold arrays prior to halftoning being performed at halftoning 214. In such an embodiment, halftone modification module 230 generates a flushing threshold array by modifying the compensated halftone threshold arrays to incorporate flushing patterns received from a flushing controller 240.

Figure 4:
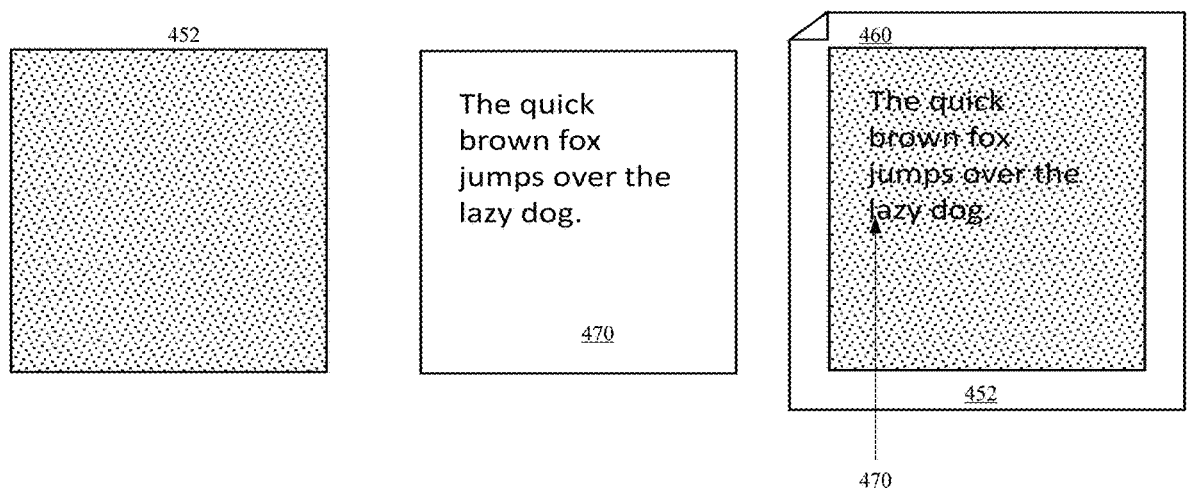
FIG. 4 illustrates one embodiment of a page printed by a print system.

Flushing controller 240 generates flushing pels for print jobs to prevent ink from clogging in pel forming elements 165 at printer 160 to ensure high print quality. FIG. 4 illustrates one embodiment of a page printed by printer 160 using pel forming elements 165. In one embodiment, printer 160 may periodically output flushing pels (e.g., marks) as a flush pattern 452. In such an embodiment, flush pattern 452 is printed on the page 460 as small dots scattered throughout the page 460 and is comingled with the printed image 470. Such a flushing pattern printed along with image data from the print job is sometimes referred to as "star flushing". The star flushing method that produces flushing dots comingled with image data from the print job is used in lieu of the alternate approach that employs printing flush lines. In the alternate flush line method, a group of solid lines are printed at the top or bottom of each page. The flush line printing area is subsequently physically cut out and removed from the page so as to not be included in the final printed material. The star flushing method does not require the flush line cutout operation. Thus, flush pattern 452 comprises a stochastic pattern that provides a minimally visible background method that produces at least the minimum ink drop emission amount and frequency to prevent clogged nozzles. The result of printing with star flushing is a printed composite image that includes the flushing pattern 452 where there is no image data and halftoned image data 470 everywhere else where there is no flushing pattern. In cases where there is contention between instructed drop size for a single pel, the largest drop size between the drop sizes determined based on the halftoned image data and the flushing pattern is assigned to the pel. While printing using small flushing drops may be the preferred implementation, it is not a requirement. The flushing drops can be any drop size available, including different drop sizes for different pels in the flushing pattern. Alternately the flushing pattern may include a structured pattern instead of or in addition to the stochastic pattern to provide a structured repeating background.

Flushing (which may also be referred to as purging, cleaning, or spitting) causes extra firings of pel forming elements 165 that are not part of the image data from the print job. Accordingly, flushing controller 240 is implemented to generate flushing pels defined by the printing flush patterns 452 for each of a plurality of color planes implemented at printer 160 (e.g., CMYK). Flushing controller 240 may be implemented, for example, as custom circuitry, as a special or general purpose processor executing programmed instructions stored in an associated program memory, or some combination thereof. While flushing controller 240 is illustrated as an independent element in FIG. 2, in some embodiments flushing controller 240 may be integrated into print controller 140. Note that flush pattern 452 in FIG. 4 is not shown as low visibility in order to more clearly show the details. The image data from the print job may be either text (as shown) or a shaded graphic image (not shown).

Figure 5:
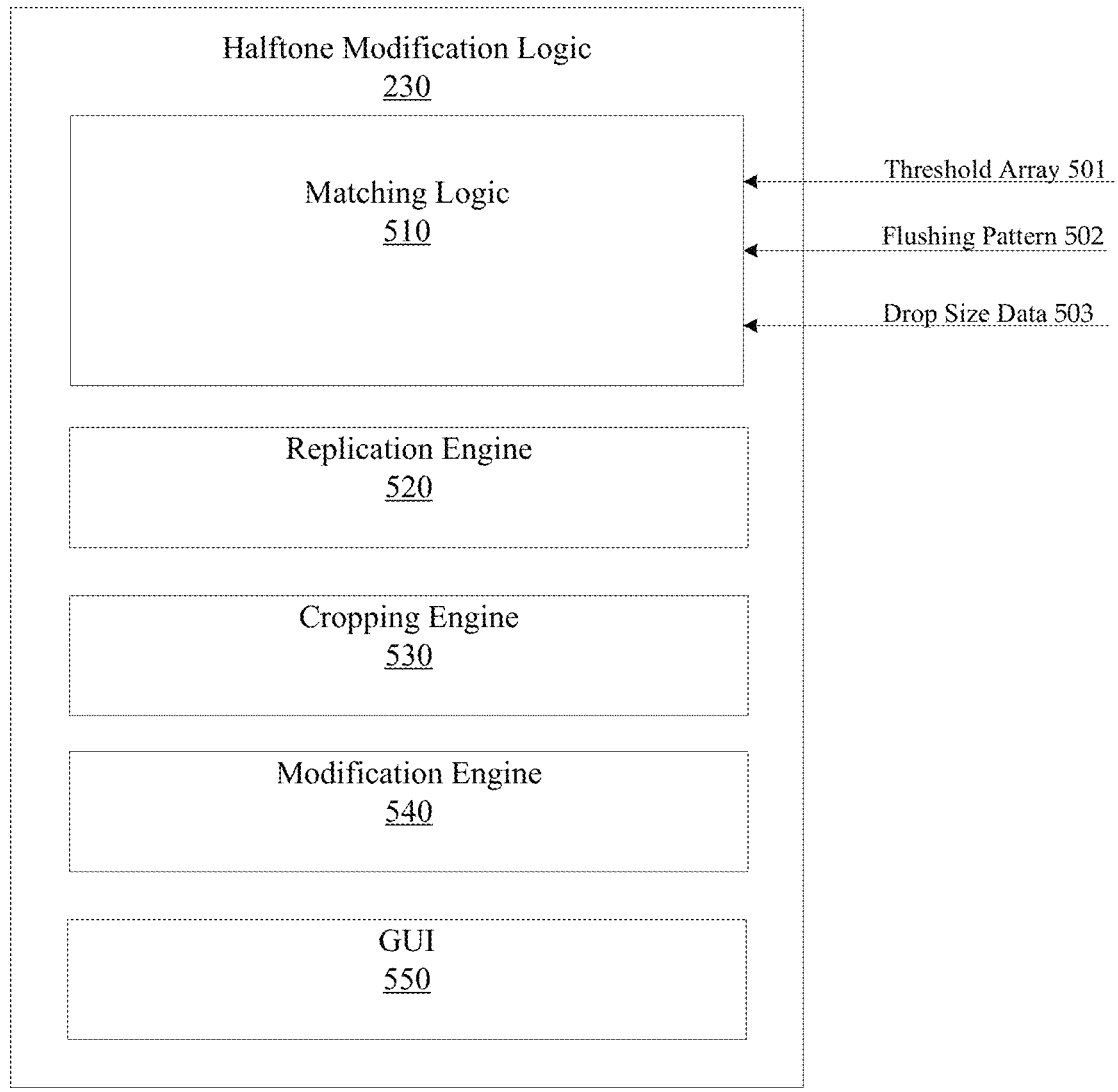
FIG. 5 illustrates one embodiment of halftone modification logic.

FIG. 5 illustrates one embodiment of halftone modification logic 230. According to one embodiment, halftone modification logic 230 receives a first halftone design (e.g., compensated halftone) comprising a first threshold array associated with a plurality of pel forming elements and a flush pattern comprising a flushing array defining a plurality of flush drop locations associated with the plurality of pel forming elements, and generates a second halftone design based on the first threshold array and the flush pattern, wherein the second halftone design defines (e.g., includes) the plurality of flush drop locations. In such an embodiment, halftone modification logic 230 generates the second halftone design by modifying the first threshold array with the flushing array to generate a flushing threshold array (e.g., a second threshold array) that defines the plurality of flush drop locations.

As shown in FIG. 5, halftone modification logic 230 includes matching logic 510 to receive a threshold array 501, flushing array (or pattern) 502 and drop size data 503 (e.g., flushing drop size data) for each of the plurality of color planes. As discussed above, a threshold array 501 comprises an array of colors, rows, columns (e.g., columns in the array associated with individual pel forming elements 165) and transitions between drop sizes (e.g., 4 drop sizes=3 transitions). A flushing pattern 502 comprises a two-dimensional pattern of rows and columns (e.g., columns in the pattern associated with individual pel forming elements 165). Each position in the flushing pattern 502 comprises a value that indicates whether a drop is to be ejected (e.g., 0=no drop; 1=drop). In this implementation the flushing pattern is binary.

Drop size data 503 provides flushing drop size data indicating the drop size (i.e., the instructed drop size) that will be employed at each of the locations in the flushing pattern where the binary value equals one. Threshold array 501 has associated with it a set of drop sizes. The flushing drop size data 503 is a member of the drop size set for threshold array 501. In a further embodiment, the flushing array (e.g., flushing pattern) may be defined using an image having different symbols for each flushing pel to define the drop sizes in the flushing pattern, instead of using a binary flushing pattern and single drop size. In this flushing image case, the flushing pattern symbols are a subset of the set of drop sizes in the threshold array 501. In one embodiment, threshold array 501 includes the drop size data 503 and in that case receiving drop size data 503 is not necessary. A technical benefit of flushing array 502 or drop size data 503 is to allow for changes or customization of the flush drop locations and sizes to suit changing system requirements.

In one embodiment, halftone modification logic 230 determines least common multiple (LCM) data providing a LCM between rows and columns (e.g., pel forming elements 165 associated with columns in threshold array 501 and flushing pattern 502) of threshold array 501 and flushing pattern 502 respectively for each of the plurality of color planes. In such an embodiment, halftone modification logic 230 determines a quantity of rows that is the LCM of the rows in threshold array 501 and rows in flushing pattern 502, as well as a quantity of columns that is the LCM of the columns in threshold array 501 and columns in flushing pattern array 502. As a result, matching logic 510 provides a common quantity of rows and columns between the threshold array 501 and flushing pattern 502 that form a common threshold array size and this process may be repeated for any additional ones of the plurality of color planes. A technical benefit of processing each color plane independently is that this allows for the flushing pattern (i.e., flush drop location and flush drop sizes) to be tailored to the needs of each color plane since each color plane may have different flushing requirements. Further, separate flushing threshold arrays for each color plane allows for flush drops for the color planes to be controlled independently from flush drops of the other color planes to achieve desired visual effects (e.g., flush drops from different color planes may be overlayed, separated or located into patterns as needed depending on system requirements).

In a further embodiment, matching logic 510 determines the size of the common threshold array based on the LCM data. In this embodiment, the common threshold array size is determined by limiting the size of the common threshold array to the size of a sheetside image bound by the total number of pel forming elements 165 of printhead 162. In the web movement direction, the number of rows in the common threshold array, obtained based on the LCM for rows, is cropped to the length of the sheetside image in the web movement direction. In the cross web direction, the number of columns in the common threshold array, obtained based on the LCM for columns, is cropped to the total number of pel forming elements 165 in the printhead 162.

For any two numbers, there is one unique least common multiple of these numbers. The size of the common threshold array (e.g., the new threshold array that will contain the modified halftone design to perform star flushing, plus everything the original halftone design performed, such as halftoning, uniformity compensation, and jet out compensation) may be obtained in the following way: First, find the LCM of the number of rows in the halftone array and the number of rows in the star flushing pattern; Second, optionally crop this number of rows to the number of rows in the output sheet sides. The result of these first and second steps is the number of rows in the common threshold array; Third, find the LCM of the number of columns in the halftone array and the number of columns in the star flushing pattern; and fourth, optionally crop this number of columns to the number of nozzles or columns in the print head assembly or, if smaller, to the number of columns in the cross-web direction. The result of these third and fourth steps is the number of columns in the common threshold array. This value, given the options chosen, is well defined (e.g., it exists and is unique). The number of transitions and colors in the new, or common threshold array is the same as the number of transitions in the original halftone array. The number of colors in the new, or common, threshold array is the same as the number of colors in the original halftone array, which is also the same as the number of colors in the flushing pattern. The new or common threshold array containing star flushing is used in the same way as the original one was by tiling it across the input image horizontally and vertically and comparing its thresholds to the contone image to determine which drop size is emitted.

Replication engine 520 replicates flushing pattern 502 to generate a first temporary flushing pattern (or TFP1) based on the common threshold array size (e.g., the LCM of the number of rows in the flushing pattern and rows in threshold array 502 and the LCM of the number of columns in the flushing pattern and columns threshold array). Similarly, replication engine 520 also replicates threshold array 501 based the common threshold size (e.g., based on the LCM of the number of rows in the flushing pattern and the number of rows in threshold array 502 and the LCM of the number of columns in the flushing pattern and number of columns in threshold array) to generate a first temporary threshold array (or TTA1). At this point the replicated flushing pattern and replicated threshold arrays are the same size in terms of the number of rows and columns. The threshold array has multiple planes of threshold data; therefore each plane is replicated in the same manner based on the LCMs.

Modification engine 540 generates a flushing threshold array. In one embodiment, modification engine 540 generates the flushing threshold array by modifying each small drop threshold within TTA1 associated with a flushing pel in the TFP1 to a value that results in a small flushing drop for contone image level zero. Such a modification of the threshold array facilitates the printing of small flushing drops for pels indicated in the flushing pattern that would otherwise have printed the zero (e.g., none) drop size in the original threshold array (e.g., first threshold array). Moreover, other pels having non-zero output drops will print the drop sizes instructed by the original threshold array. Accordingly, the modified threshold array (e.g., the flushing threshold array) includes a change to the small drop thresholds for pels in which the flushing pattern is non-zero to a threshold value in which a small drop is always being emitted for contone level zero.

Figure 3A:
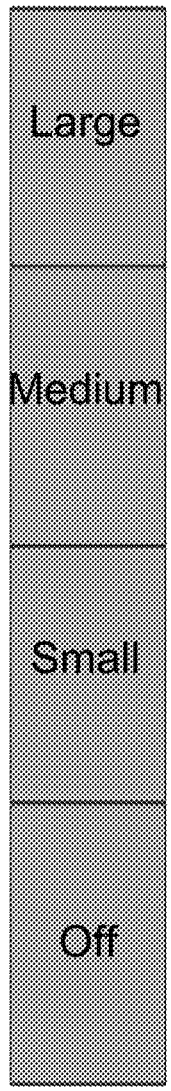
FIG. 3A illustrates one embodiment of multibit halftone designs, where the halftones are described using multi-bit threshold arrays (MTAs)

FIG. 3B shows an example of this modification based on the thresholds in FIG. 3A. An example of the binary flushing pattern TFP1 is on the left. Flushing pels have a value of one. Example small drop thresholds in TTA1 are shown in the middle and the modified small drop thresholds in TTA2 are shown on right side. For a single flushing pel 301 the corresponding threshold 302 in TTA1 is obtained. The small drop threshold 302 is modified to a value that produces a small drop with a contone value of zero. In this example a threshold value of −1 is used to replace the original threshold value 44. Element 303 shows the corresponding value in TTA2 after the threshold value replacement has occurred. All small drop thresholds corresponding to the flushing pattern pels having a value of one are modified in the same manner. In this example four thresholds have been modified, corresponding to four flushing pels. The replacement threshold value used to obtain a flushing drop for a contone value of zero depends on the specific halftoning equations used. This example, using replacement threshold value of −1, assumes halftoning equations for when a small drop is produced have the form: I>TTA2(:,:,3) & I<=TTA2(:,:,2). Where I is the contone image level, TTA2(:,:,3) is the plane containing the small drop thresholds and TTA2(:,:,2) is the plane describing medium drop thresholds.

Figure 3C:
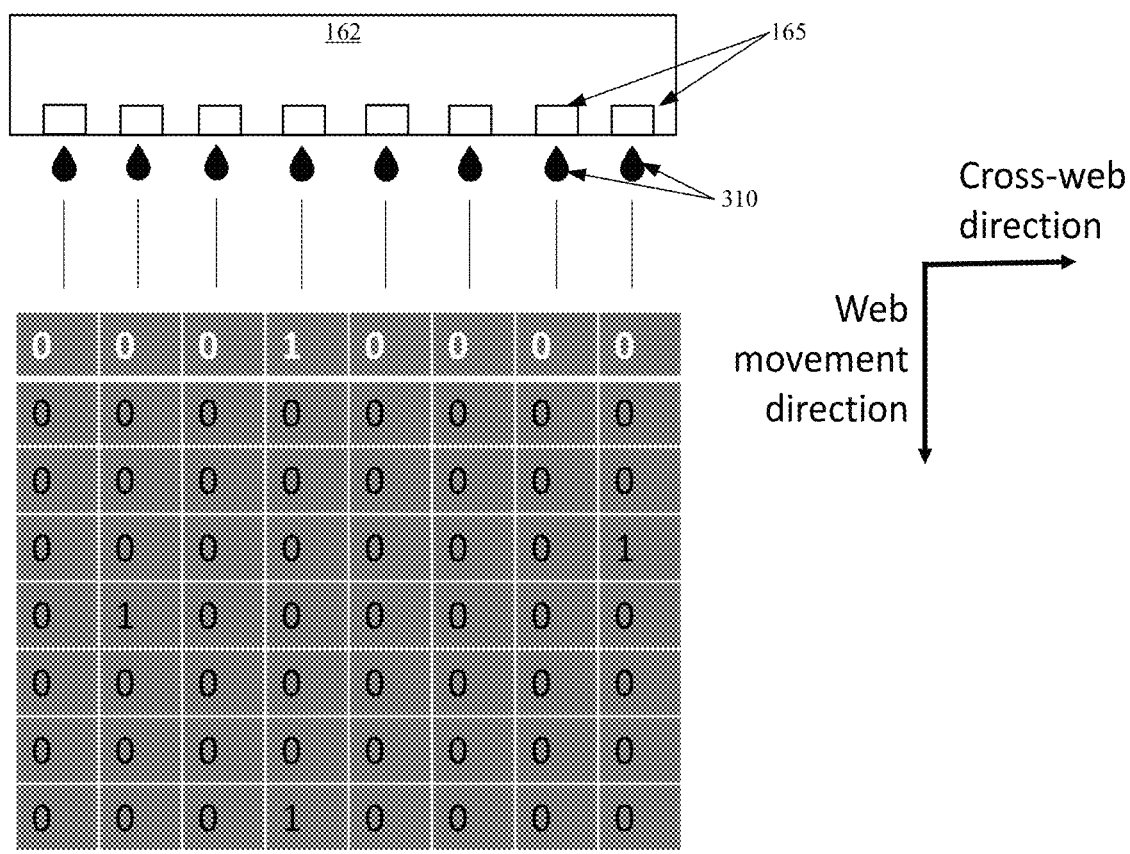
FIG. 3C illustrates one embodiment of ink drops emitted by pel forming elements.

FIG. 3C illustrates one embodiment of ink drops 310 emitted from a pel forming elements 165 in a print head 162 based on an 8×8 flushing array. In one embodiment, the pel forming elements 165 have a pre-defined mapping to both the columns of the flushing array and the halftone designs (e.g., halftone threshold arrays) based on the design of printer 160. The paper movement direction and cross-web direction are also shown.

In some embodiments, the pre-existing halftone logic ensures that the flushing drop is automatically overridden with a larger drop in cases where the contone image value produces a larger drop than the flushing drop. Thus, no further logic beyond the pre-existing halftoner logic is needed to achieve this in these embodiments. If the pre-existing halftoner logic does not automatically exhibit this behavior, it may be replaced with halftoner logic that does this. This is straightforward to achieve. For example, the halftone logic may test each pixel for emission of the largest drop first, and if this drop is emitted, it will not perform any more processing on that pixel. Next, if the largest drop was not emitted, the halftoner logic will test for the emission of the second-largest drop; and if this drop is emitted, it will not perform any more processing on that pixel. This series of tests on each pixel continues until the pixel has been tested for emission of all non-zero drop sizes. If no drop was emitted in these tests, the symbol for the zero or none drop is emitted instead. In other embodiments, the output image was pre-filled with zero (none) drop symbols, thus the halftoner logic merely skips over the pre-written output pixel when the zero (none) drop is wanted. In this way, larger drops that are emitted always supersede smaller drops that might otherwise have been emitted, whether they were flushing drops or ordinary image drops.

In a further embodiment, flushing threshold array may be changed to include medium or large flushing drops by modifying the corresponding thresholds at the flushing pel locations. In one embodiment where medium flushing drops are produced, each medium drop threshold in TTA1 associated with a flushing pel in the TFP1 in the same common pel location is modified to a value that results in a medium flushing drop for contone image level zero. In a further embodiment where large flushing drops are produced each large drop threshold in TTA1 associated with a flushing pel in the TFP1 in the same common pel location are modified to a value that results in a large flushing drop for contone image level zero. In other embodiments, smaller drop thresholds than the drop size used for flushing may also be modified to a value which produces those smaller drops in the case of contone image level zero; but this is not necessary if the halftoner logic automatically supersedes smaller drops by larger drops in cases where the contone image value exceeds both thresholds, as explained above.

In a further embodiment where a mixture of different flushing drop sizes are produced, each small drop, medium drop and large drop thresholds in TTA1 associated with a flushing pattern in TFP1 are modified to a value that results in the drop sizes indicated by the drop size symbols in the symbolic flushing pattern for contone image level zero.

In some instances, the original threshold array may include placeholder thresholds that include a special value that indicates that a corresponding pel forming element 165 is to never eject a drop. In yet a further embodiment, modification engine 540 modifies such placeholder thresholds for pel locations in TFP1 that indicate a flushing drop is to be ejected. In this case a drop size that is never ejected is replaced by a flushing drop that is always ejected. The modification of placeholder thresholds is done only to the thresholds corresponding to the flushing drop sizes. Therefore, this is the same process to produce flushing drops except the original thresholds that are being modified are thresholds that have placeholder values.

In an alternative embodiment, cropping engine 530 may be implemented to generate a second temporary threshold array (TTA2). In such an embodiment, TTA2 is generated by cropping TTA1. The size for TTA2 in the web movement direction is the number of rows in TTA1 cropped to the length of the sheetside image in the web movement direction. The size for TTA2 in the cross-web direction is the smaller of the total number of pel forming elements in printhead 162 or the number of total pixels in the cross-web direction. Thus, cropping engine 530 matches the number of rows and columns of TTA2 to the actual number of required rows and columns without unnecessary threshold data by cropping TTA1. The modified threshold array TTA2 is compared pel by pel to the sheetside contone image 120 to perform halftoning additional threshold information exceeding the sheetside image size is not required. Similarly, cropping engine 530 may also be implemented to generate a second temporary flushing pattern (TFP2) by cropping TFP1 to the same number of rows and columns as TTA2 ignoring the planes for different drop sizes.

According to one embodiment, halftone matching logic 230 also includes a graphical user interface (GUI) 550 to enable/disable flushing threshold array generation. In such an embodiment, halftone matching logic 230, upon being enabled (or activated), generates a new flushing threshold array upon receiving a new flushing pattern from flushing controller 240 and/or receiving an updated compensated halftone 220 from compensation module 216. Further, halftone matching logic 230, upon being disabled, does not modify the compensated halftone 220 and the unmodified compensated halftone 220 is passed to halftoning module 214. Although shown as being included within halftone matching logic 230, GUI logic 550 may be incorporated within other components of printing system 130 (e.g., print controller 140, flushing controller 240 or other processing components).

Figure 6:
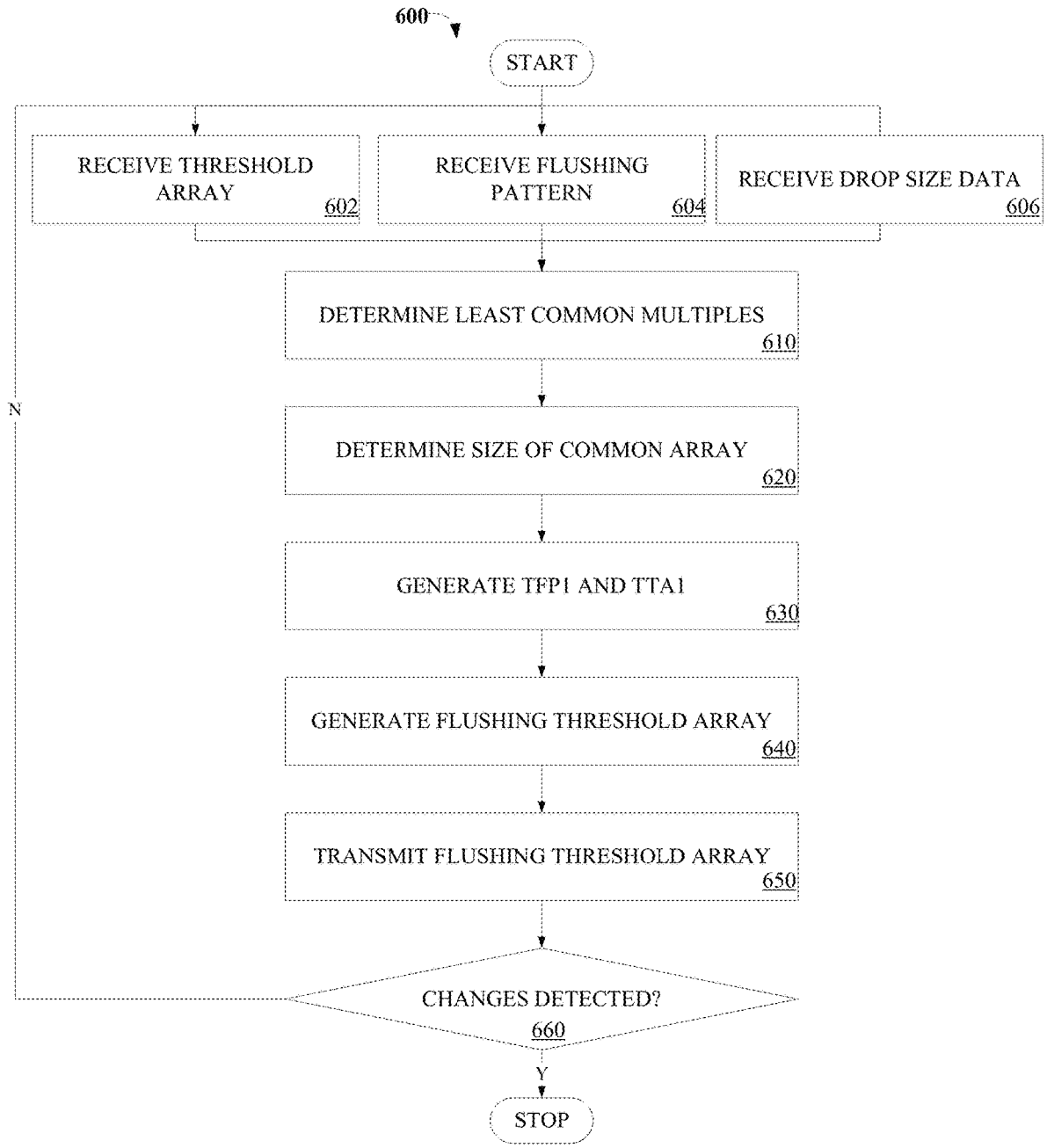
FIG. 6 is a flow diagram illustrating embodiments of a process performed by halftone modification logic.

FIG. 6 is a flow diagram illustrating a process 600 for generating a flushing halftone array. Process 600 may be performed by processing logic that may include hardware (e.g., circuitry, dedicated logic, programmable logic, microcode, etc.), software such as instructions run on a processing device, or a combination thereof. In one embodiment, process 600 is performed by halftone modification module 216.

Process 600 begins at processing blocks 602, 604 and 606, the threshold array 501, flushing pattern 502 and drop size data 503, respectively, are received. At processing block 610, the row and column LCMs are determined or otherwise received. At processing block 620, the size of the common threshold array size is determined. As discussed above, the size of the common threshold array is determined by limiting the size of the common threshold array to the size of a sheetside image bound by the number of pel forming elements of printhead 162.

At processing block 630, TFP1 and TTA1 are generated. As mentioned above, the TFP1 and TTA1 are generated by replicating flushing pattern 502 and threshold array 501, respectively. Additionally, a TFP2 and TTA2 may be generated by cropping TFP1 and TTA1, respectively, to the size of the common threshold array. At processing block 640, the flushing threshold array is generated by modifying each threshold within TTA1 associated with a pel in the TFP1 to a value that results in a small flushing drop for contone image level zero. In an additional embodiment TTA1 thresholds are each modified to produce any one of the drop sizes associated with threshold array 501.

At processing block 650, the flushing threshold array is transmitted (e.g., to halftoning module 214 or printer 160 where the flushing threshold array is received and applied to the image data to produce halftone bitmaps). Process 600 may be repeated for each color plane. At decision block 660, a determination is made as to whether one or more changes have been detected. In one embodiment, such changes may include changes to the first threshold array, flushing pattern, drop size data, or page dimension. Control is returned to processing blocks 602, 604 and 606 upon a determination that a change has been made, where, the threshold array 501, flushing pattern 502 and drop size data 503, respectively, are received. Otherwise, the process has been completed.

Although shown as a component of print controller 140, other embodiments may feature halftone modification module 230 included within an independent device, or combination of devices, communicably coupled to print controller 140. For instance, FIG. 7 illustrates one embodiment of a halftone modification module 230 implemented in a network 700.

Figure 7:
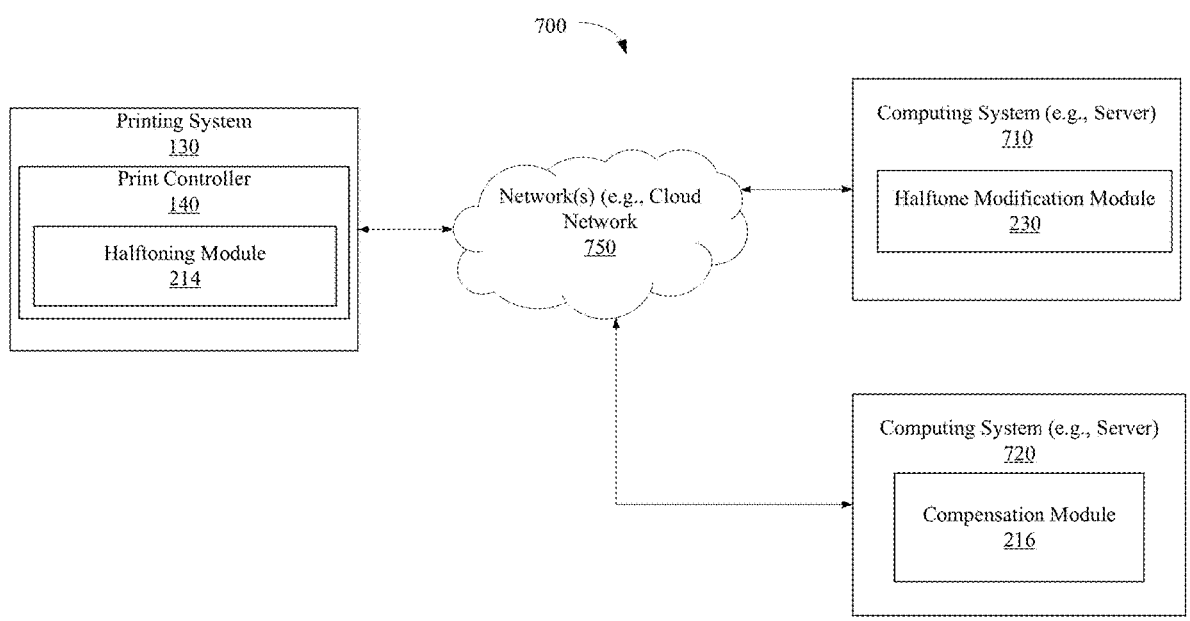
FIG. 7 illustrates one embodiment of a halftone modification logic implemented in a network.

As shown in FIG. 7, halftone modification module 230 is included within a computing system 710, compensation module 216 is included within computing system 720 and compensation halftoning module 214 is included within printing system 130. In this embodiment, halftone modification module 230 may receive compensated halftones 220 from compensation module 216 at computing system 720 via cloud network 750.

Figure 8:
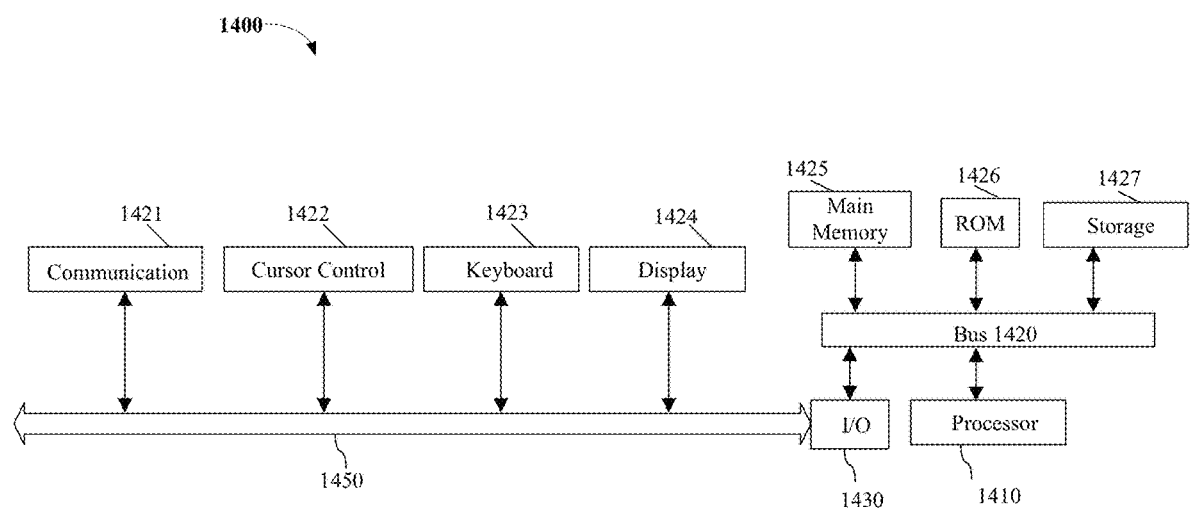
FIG. 8 illustrates one embodiment of a computer system.

FIG. 8 illustrates a computer system 1400 on which printing system 130, print controller 140, compensation module 216 and/or halftone modification module 230 may be implemented. Computer system 1400 includes a system bus 1420 for communicating information, and a processor 1410 coupled to bus 1420 for processing information.

Computer system 1400 further comprises a random access memory (RAM) or other dynamic storage device 1425 (referred to herein as main memory), coupled to bus 1420 for storing information and instructions to be executed by processor 1410. Main memory 1425 also may be used for storing temporary variables or other intermediate information during execution of instructions by processor 1410. Computer system 1400 also may include a read only memory (ROM) and or other static storage device 1426 coupled to bus 1420 for storing static information and instructions used by processor 1410.

A data storage device 1427 such as a magnetic disk or optical disc and its corresponding drive may also be coupled to computer system 1400 for storing information and instructions. Computer system 1400 can also be coupled to a second I/O bus 1450 via an I/O interface 1430. A plurality of I/O devices may be coupled to I/O bus 1450, including a display device 1424, an input device (e.g., an alphanumeric input device 1423 and or a cursor control device 1422). The communication device 1421 is for accessing other computers (servers or clients). The communication device 1421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store halftone modification logic, and one or more processors coupled with the at least one physical memory device to execute the halftone modification logic to receive a first halftone design comprising a first threshold array associated with a plurality of pel forming elements, receive a flush pattern comprising a flushing array defining a plurality of flush drop locations associated with the plurality of pel forming elements, and generate a second halftone design based on the first threshold array and the flush pattern, wherein the second halftone design defines the plurality of flush drop locations.

Example 2 includes the subject matter of Example 1, wherein the halftone modification logic generates the second halftone design by modifying the first threshold array with the flushing array to generate the flushing threshold array that defines the plurality of flush drop locations; wherein the second halftone design comprises the flushing threshold array.

Example 3 includes the subject matter of Examples 1 and 2, wherein the halftone modification logic further generates the second halftone design based on a common threshold array size between the flushing array and the threshold array.

Example 4 includes the subject matter of Examples 1-3, wherein generating the common threshold array size comprises determining a least common multiple between rows and columns in flushing array and rows and columns in the threshold array.

Example 5 includes the subject matter of Examples 1-4, wherein the halftone modification logic further generates the second halftone design by replicating the flushing array to generate a first temporary flushing pattern and replicating the threshold array to generate a first temporary threshold array.

Example 6 includes the subject matter of Examples 1-5, wherein the halftone modification logic further generates the second halftone design by cropping the first temporary flushing pattern to the size of the common threshold array to generate a second temporary flushing pattern and cropping the first temporary threshold array to the size of the common threshold array to generate a second temporary threshold array.

Example 7 includes the subject matter of Examples 1-6, wherein modifying the threshold array comprises modifying threshold values in the threshold array at the flush drop locations to generate flush drop threshold values that correspond to flush drops for input contone image values of zero.

Example 8 includes the subject matter of Examples 1-7, wherein the memory device further to include a graphical user interface (GUI) and the one or more processors to execute the GUI to enable or disable the halftone modification logic.

Example 9 includes the subject matter of Examples 1-8, wherein the halftoning logic further to transmit the second halftone design to a printing system.

Example 10 includes the subject matter of Examples 1-9, further comprising a print engine including the plurality of pel forming elements.

Some embodiments pertain to Example 11 that includes at least one computer readable medium having instructions stored thereon, which when executed by one or more processors, cause the processors to receive a first halftone design comprising a first threshold array associated with a plurality of pel forming elements, receive a flush pattern comprising a flushing array defining a plurality of flush drop locations associated with the plurality of pel forming elements and generate a second halftone design based on the first threshold array and the flush pattern, wherein the second halftone design defines the plurality of flush drop locations.

Example 12 includes the subject matter of Example 11, having instructions stored thereon, which when executed by one or more processors, further cause the processors to generate the second halftone design by modifying the first threshold array with the flushing array to generate the flushing threshold array that defines the plurality of flush drop locations; wherein the second halftone design comprises the flushing threshold array.

Example 13 includes the subject matter of Examples 11 and 12, having instructions stored thereon, which when executed by one or more processors, further cause the processors to generate the second halftone design based on a common threshold array size between the flushing array and the threshold array.

Example 14 includes the subject matter of Examples 11-13, wherein generating the common threshold array size comprises determining a least common multiple between rows and columns in flushing array and rows and columns in the threshold array.

Example 15 includes the subject matter of Examples 11-14, having instructions stored thereon, which when executed by one or more processors, further cause the processors to the second halftone design by replicating the flushing array to generate a first temporary flushing pattern and replicating the threshold array to generate a first temporary threshold array.

Some embodiments pertain to Example 16 that includes a method comprising receiving a first halftone design comprising a first threshold array associated with a plurality of pel forming elements, receiving a flush pattern comprising a flushing array defining a plurality of flush drop locations associated with the plurality of pel forming elements and generating a second halftone design based on the first threshold array and the flush pattern, wherein the second halftone design defines the plurality of flush drop locations.

Example 17 includes the subject matter of Example 16, further comprising generating the second halftone design by modifying the first threshold array with the flushing array to generate the flushing threshold array that defines the plurality of flush drop locations; wherein the second halftone design comprises the flushing threshold array.

Example 18 includes the subject matter of Examples 16 and 19, further comprising generating the second halftone design based on a common threshold array size between the flushing array and the threshold array.

Example 19 includes the subject matter of Examples 16-19, wherein generating the common threshold array size comprises determining a least common multiple between rows and columns in flushing array and rows and columns in the threshold array.

Example 20 includes the subject matter of Examples 16-19, further comprising generating the second halftone design by replicating the flushing array to generate a first temporary flushing pattern and replicating the threshold array to generate a first temporary threshold array.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store halftone modification logic; and
   one or more processors coupled with the at least one physical memory device to execute the halftone modification logic to:
      receive a first halftone design comprising a first threshold array associated with a plurality of pel forming elements;
      receive a flush pattern comprising a flushing array defining a plurality of flush drop locations associated with the plurality of pel forming elements; and
      generate a second halftone design based on the first threshold array and the flush pattern, wherein the second halftone design defines the plurality of flush drop locations.

2. The system of claim 1, wherein the halftone modification logic generates the second halftone design by modifying the first threshold array with the flushing array to generate the flushing threshold array that defines the plurality of flush drop locations; wherein the second halftone design comprises the flushing threshold array.

3. The system of claim 2, wherein the halftone modification logic further generates the second halftone design based on a common threshold array size between the flushing array and the threshold array.

4. The system of claim 3, wherein generating the common threshold array size comprises determining a least common multiple between rows and columns in the flushing array and rows and columns in the threshold array.

5. The system of claim 1, wherein the halftone modification logic further generates the second halftone design by replicating the flushing array to generate a first temporary flushing pattern and replicating the threshold array to generate a first temporary threshold array.

6. The system of claim 5, wherein the halftone modification logic further generates the second halftone design by cropping the first temporary flushing pattern to a size of a common threshold array to generate a second temporary flushing pattern and cropping the first temporary threshold array to the size of the common threshold array to generate a second temporary threshold array.

7. The system of claim 2, wherein modifying the threshold array comprises modifying threshold values in the threshold array at the flush drop locations to generate flush drop threshold values that correspond to flush drops for input contone image values of zero.

8. The system of claim 1, wherein the memory device further to include a graphical user interface (GUI) and the one or more processors to execute the GUI to enable or disable the halftone modification logic.

9. The system of claim 1, wherein the halftoning logic further to transmit the second halftone design to a printing system.

10. The system of claim 1, further comprising a print engine including the plurality of pel forming elements.

11. At least one non-transitory computer readable medium having instructions stored thereon, which when executed by one or more processors, cause the processors to:
    receive a first halftone design comprising a first threshold array associated with a plurality of pel forming elements;
    receive a flush pattern comprising a flushing array defining a plurality of flush drop locations associated with the plurality of pel forming elements; and
    generate a second halftone design based on the first threshold array and the flush pattern, wherein the second halftone design defines the plurality of flush drop locations.

12. The computer readable medium of claim 11, having instructions stored thereon, which when executed by one or more processors, further cause the processors to generate the second halftone design by modifying the first threshold array with the flushing array to generate the flushing threshold array that defines the plurality of flush drop locations; wherein the second halftone design comprises the flushing threshold array.

13. The computer readable medium of claim 12, having instructions stored thereon, which when executed by one or more processors, further cause the processors to generate the second halftone design based on a common threshold array size between the flushing array and the threshold array.

14. The computer readable medium of claim 13, wherein generating the common threshold array size comprises determining a least common multiple between rows and columns in a flushing array and rows and columns in the threshold array.

15. The computer readable medium of claim 11, having instructions stored thereon, which when executed by one or more processors, further cause the processors to the second halftone design by replicating the flushing array to generate a first temporary flushing pattern and replicating the threshold array to generate a first temporary threshold array.

16. A method comprising:
    receiving a first halftone design comprising a first threshold array associated with a plurality of pel forming elements;
    receiving a flush pattern comprising a flushing array defining a plurality of flush drop locations associated with the plurality of pel forming elements; and
    generating a second halftone design based on the first threshold array and the flush pattern, wherein the second halftone design defines the plurality of flush drop locations.

17. The method of claim 16, further comprising generating the second halftone design by modifying the first threshold array with the flushing array to generate the flushing threshold array that defines the plurality of flush drop locations; wherein the second halftone design comprises the flushing threshold array.

18. The method of claim 17, further comprising generating the second halftone design based on a common threshold array size between the flushing array and the threshold array.

19. The method of claim 18, wherein generating the common threshold array size comprises determining a least common multiple between rows and columns in flushing array and rows and columns in the threshold array.

20. The method of claim 16, further comprising generating the second halftone design by replicating the flushing array to generate a first temporary flushing pattern and replicating the threshold array to generate a first temporary threshold array.

\* \* \* \* \*